Nov. 23, 1954   M. D. SMITH ET AL   2,695,045
RESILIENT REINFORCING ELEMENT
Filed Aug. 24, 1953
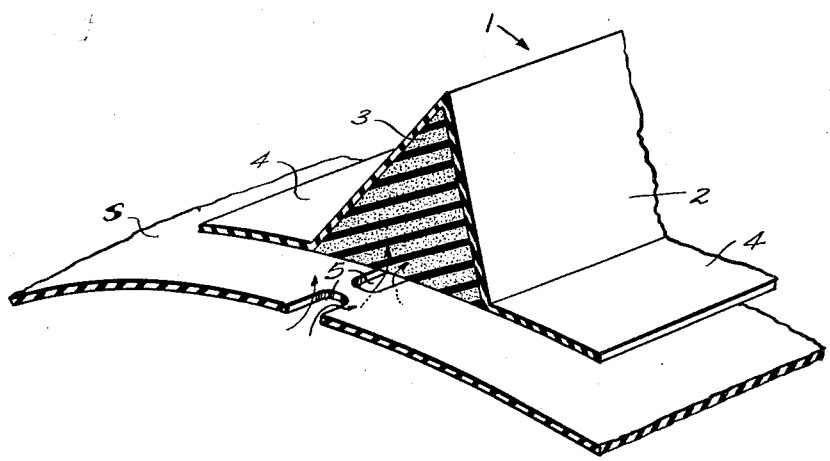
INVENTORS
MILTON D. SMITH
WALTER B. BREWER
BY
ATTORNEYS

United States Patent Office 2,695,045
Patented Nov. 23, 1954

2,695,045

RESILIENT REINFORCING ELEMENT

Milton D. Smith, Snyder, and Walter B. Brewer, East Aurora, N. Y., assignors to the United States of America as represented by the Secretary of the Air Force Application August 24, 1953, Serial No. 379,482

6 Claims. (Cl. 150—0.5)

The invention described herein may be manufactured and used by or for the Government for governmental purposes without the payment of any royalty thereon.

This invention is directed to a new and improved reinforcing element for inflatable structures which can be used to produce other than pressure generated shapes in such structures and which afford strength and stability. There has long been a serious problem presented in the manufacture and employment of inflatable structures due to the difficulty of producing inflatable articles which on inflation can obtain and maintain a predetermined shape and which have sufficient stability and strength to resist the elements. The improved reinforcing element which is the subject of this invention is the first practical solution to this problem providing the necessary strength and stability to inflatable structures.

An object of this invention is to provide a new and improved structural reinforcing element.

Another object of this invention is to provide a preformed flexible reinforcing element applicable to inflatable structures to strengthen and stabilize such structures on inflation.

An additional object of the invention is to provide an improved flexible reinforcing element which will contain the shape of an inflated structure.

A further object of the invention is to provide a new and improved structural reinforcing element particularly applicable to inflatable structures which is strengthened on inflation of the structure to which it is applied.

Other objects and advantages of the invention will be readily apparent to those versed in the art from the following specification taken in conjunction with the accompanying drawings wherein:

Fig. 1 is a perspective cross-sectional view of the new and improved structural reinforcing element which is the subject of this invention as applied to an inflatable structure.

As shown in Fig. 1 of the drawings, the practical embodiment of the invention therein comprises an element 1 having an outer sheet 2 of non-porous flexible material such as a rubber or rubberized fabric. Connected to the inner surface of the outer sheet as by cementing is a contoured filler 3 of porous material such as porous rubber and of predetermined size and shape, the cross-section in this practical embodiment shown being triangular in nature. The outer sheet 2 completely contains this filler and has extensions 4 extending therefrom longitudinally thereof for sealing the reinforcing element to the inflatable structure S to which it is applied as shown. In the preferred application of the reinforcing element, one side of the contoured filler 3 as indicated in Fig. 1 of the drawings is in direct contact with the inflatable structure to which it is applied and openings 5 are made in the inflatable structure contiguous to the filler element and within the limits thereof in the preferred application so as to put the filler in communication with the inflating medium in the inflatable structure. End pieces, not shown, of the outer sheet 2 complete the enclosure of the porous filler element. Upon the inflation of the structure S the inflating medium will be directed through such openings 5 to the porous filler element developing through and filling the interconnecting cells thereof with the inflating medium lending a reinforcing and strengthening pressure to the filler which retains its predetermined shape and effects increased strength and stability to the structure in its contained form.

The particular shape and size of the filler in its contained form which is utilized is dependent on the needs of the particular inflatable structure to which it is applied.

An example of an application of the invention would be its use on inflatable tow targets. By application of the reinforcing element to tow targets, it may be used as a fin to stabilize the tow target and to strengthen the tow target to provide increased resistance to greater external loads. The application of the reinforcing element in its preferred form will direct the inflating medium into the fin limiting the tow target to a predetermined shape as well as strengthening the tow target.

Similarly the novel reinforcing element is applicable to portable shelters, the proper application thereof tending to limit the pressure generated shape to a specific contour while providing increased strength and stability to such structure and a greater ability to withstand the elements.

Many other applications and modifications of the invention will be readily apparent to those versed in the art and the form of the invention and applications referred to herein are intended to be illustrative rather than limiting in nature. The scope of the invention is wide in application and is intended to be limited only as defined by the claims.

It is again noted that the reinforcing element has its strength and stability increased by its proper application to an inflatable structure as shown.

What we claim is:

1. A reinforcing device for inflatable structures comprising a filler element of predetermined shape and of cellular structure, means providing an impervious covering externally of said filler element, an opening in said impervious covering means on the side of the filler to be located in contiguous relation to the structure to be inflated, and means for securing said cover to the inflatable structure to which the reinforcing structure is applied.

2. A reinforcing device comprising a pre-formed element of flexible cellular material and predetermined shape, a cover on said element arranged to contain the predetermined shape of the element, means associated with said cover to fix said element to the object to be reinforced, said cover providing an opening for the introduction of an inflating medium thereto whereby the preformed element is reinforced and stabilized.

3. A reinforcing element for inflatable structures comprising an outer covering of impervious flexible material, an inner filling of porous material of predetermined shape, said outer covering having means connected thereto to be connected to an inflatable structure in a sealing manner to maintain said porous filling in contiguous relation to the inflatable structure to which it is applied.

4. A reinforcing element for inflatable structures comprising a porous pre-formed element of predetermined shape, an outer covering for said element to contain such shape, said covering being open at one side thereof for application to the inflatable structure to be reinforced, and means for connecting said covering to the inflatable structure to provide a predetermined contour thereto.

5. In combination with an inflatable structure, a rinforcing device comprising a pre-formed element of predetermined shaped and of porous material, a cover means of impervious material containing said preformed element and including means for sealingly engaging the inflatable structure with the said element in contiguous relation thereto, and means defining an opening in the inflatable structure forming a communicating passage between said inflatable structure and said element of porous material whereby on inflation of the inflatable structure the inflating medium will be directed to the porous element with a resulting stabilization and strengthening of the inflatable structure.

6. In combination with an inflatable structure, a reinforcing device comprising a pre-formed element of predetermined size and shape and of material having cellular structure, a cover means for said element conforming to said predetermined size and shape and having extensions for sealing said element to said inflatable structure, and means defining an opening in the inflatable structure communicating the inflating medium to said element on inflation of the inflatable structure whereby a stabilized and strengthened structure obtains.

References Cited in the file of this patent

UNITED STATES PATENTS

| Number | Name | Date |
|---|---|---|
| 1,686,646 | Upson | Oct. 9, 1928 |
| 2,408,789 | Luisada | Oct. 8, 1946 |
| 2,505,845 | Alvarez | May 2, 1950 |